United States Patent [19]

Achelpohl et al.

[11] Patent Number: 4,734,088

[45] Date of Patent: Mar. 29, 1988

[54] APPARATUS FOR MAKING BAGS

[75] Inventors: Fritz Achelpohl; Helmut Simon, both of Lengerich, Fed. Rep. of Germany

[73] Assignee: Windmöller & Hölscher, Lengerich, Fed. Rep. of Germany

[21] Appl. No.: 903,177

[22] Filed: Sep. 3, 1986

[30] Foreign Application Priority Data

Sep. 3, 1985 [DE] Fed. Rep. of Germany ....... 3531457

[51] Int. Cl.[4] ............................................ F16H 55/48

[52] U.S. Cl. .................................... 493/194; 493/203; 493/207; 493/209; 83/614; 156/515

[58] Field of Search ............... 493/194, 199, 203, 206, 493/207, 209; 83/614; 156/515

[56] References Cited

U.S. PATENT DOCUMENTS

| | | | |
|---|---|---|---|
| 3,553,406 | 1/1971 | Kugler | 156/515 |
| 3,733,951 | 5/1973 | Fujimoto | 83/614 |
| 4,230,029 | 10/1980 | Schott, Jr. | 83/614 |
| 4,518,378 | 5/1985 | Schulze et al. | 493/194 |
| 4,613,320 | 9/1986 | Lerner | 493/203 |

FOREIGN PATENT DOCUMENTS

| | | |
|---|---|---|
| 2005040 | 8/1970 | Fed. Rep. of Germany . |
| 2556968 | 6/1977 | Fed. Rep. of Germany . |

*Primary Examiner*—Frederick R. Schmidt
*Assistant Examiner*—Robert Showalter
*Attorney, Agent, or Firm*—Fleit, Jacobson, Cohn & Price

[57] ABSTRACT

Apparatus for severing bags from a two-ply web of thermoplastic material. The apparatus includes web guide rollers defining a nip, and a plurality of peripheral grooves in the guide rollers in which upper and lower air directing tubes are positioned to guide a web as it passes downstream of the feed rollers. A continuously transversely moving severing knife is provided downstream of the feed rollers and below the plane defined by the moving web. A pair of welding jaws are provided adjacent the cutting knife to grip the web in a plane below the web movement plane to weld the plies of the web together and to deflect the web into position for providing a transverse cut therein by means of the severing knife. A pivot lever is provided to pivot downstream ends of the lower air directing tubes in a downward direction to prevent interference between the downwardly deflected web and the downstream ends of the air directing tubes. A set of clamping jaws is provided on the opposite side of the severing knife from the welding jaws in order to securely hold the web during the cutting operation.

15 Claims, 3 Drawing Figures

APPARATUS FOR MAKING BAGS

BACKGROUND OF THE INVENTION

1. Field of the Invention

This invention relates to apparatus for making bags from a two-ply web of thermoplastic material, and more particularly to apparatus for providing transverse welds in the web of thermoplastic material and for severing the web at predetermined positions therealong.

2. Description of the Prior Art

West German Patent Publication No. 20 05 040 discloses apparatus for making bags in which the formation of a transverse weld is effected by a pair of oppositely disposed, movable welding jaws in which both an upper and a lower welding jaw is movable relative to the other and toward and away from the web of thermoplastic material from which bags are severed. The lower welding jaw is adapted to be forced by the upper welding jaw into the web cutting plane against a spring force, so that a bag can be severed from the web by cutting the same at a point adjacent to a weld line that is formed by the upper and lower welding jaws. However, that apparatus requires separate moving and guiding means for guiding each of the upper and lower welding jaws, which thereby imparts undesired complexity to the apparatus.

It is an object of the present invention to provide an improved bag making apparatus in which the structure of the apparatus is simplified by fixedly mounting the lower welding jaw and at the same time preventing contact between the web and a severing knife between successive welding cycles.

SUMMARY OF THE INVENTION

Briefly stated, in accordance with one aspect of the present invention, apparatus is provided for making bags from a two-ply web of thermoplastic material by transversely cutting and welding the web at longitudinally spaced intervals. The apparatus includes a frame for supporting the several elements thereof, and a feed means for intermittently feeding a web in steps corresponding to a bag length. The feed means feeds the web to a welding station at which the two webs are joined together. The welding station includes means for welding together the two plies of thermoplastic material when the web is stopped, the weld being effected along a weld line extending transverse to the direction of web movement. Cutting means are provided for cutting a bag from the web along a cutting line spaced downstream from and substantially parallel to the weld line. The cutting means includes a severing knife positioned below the plane of movement of the web and supported and guided for movement in a transverse direction relative to the web movement direction to sever a bag portion from the web while the web is stopped. The welding means is operable to deflect the stopped web downwardly toward the severing knife a distance sufficient to enable the knife to sever the web in a transverse movement relative to the web movement direction.

DESCRIPTION OF THE PREFERRED EMBODIMENTS

Figure 1:
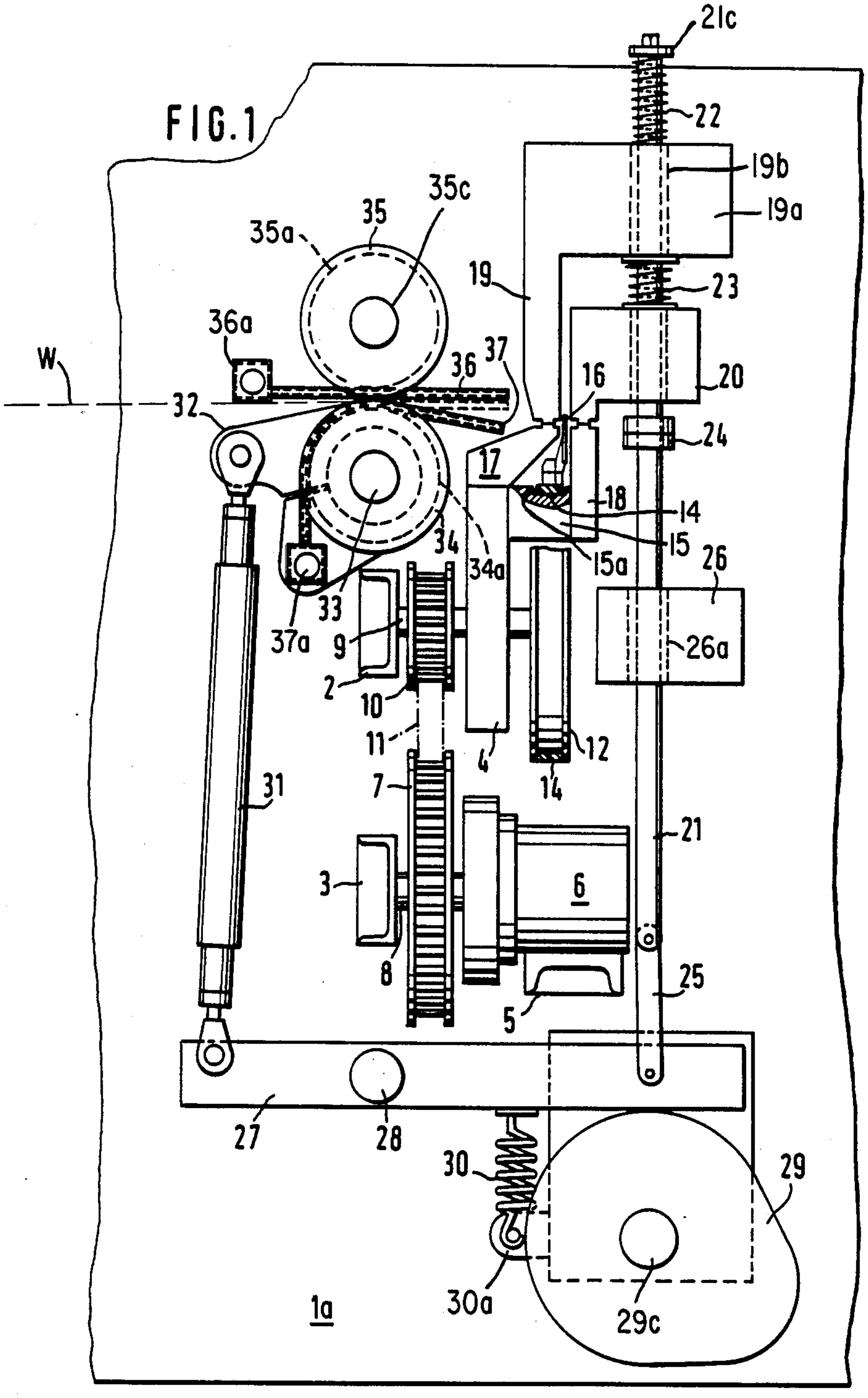
FIG. 1 is a fragmentary cross-sectional side elevational view showing a web cutting and welding station forming a part of a bag making machine in accordance with the present invention.
Figure 3:
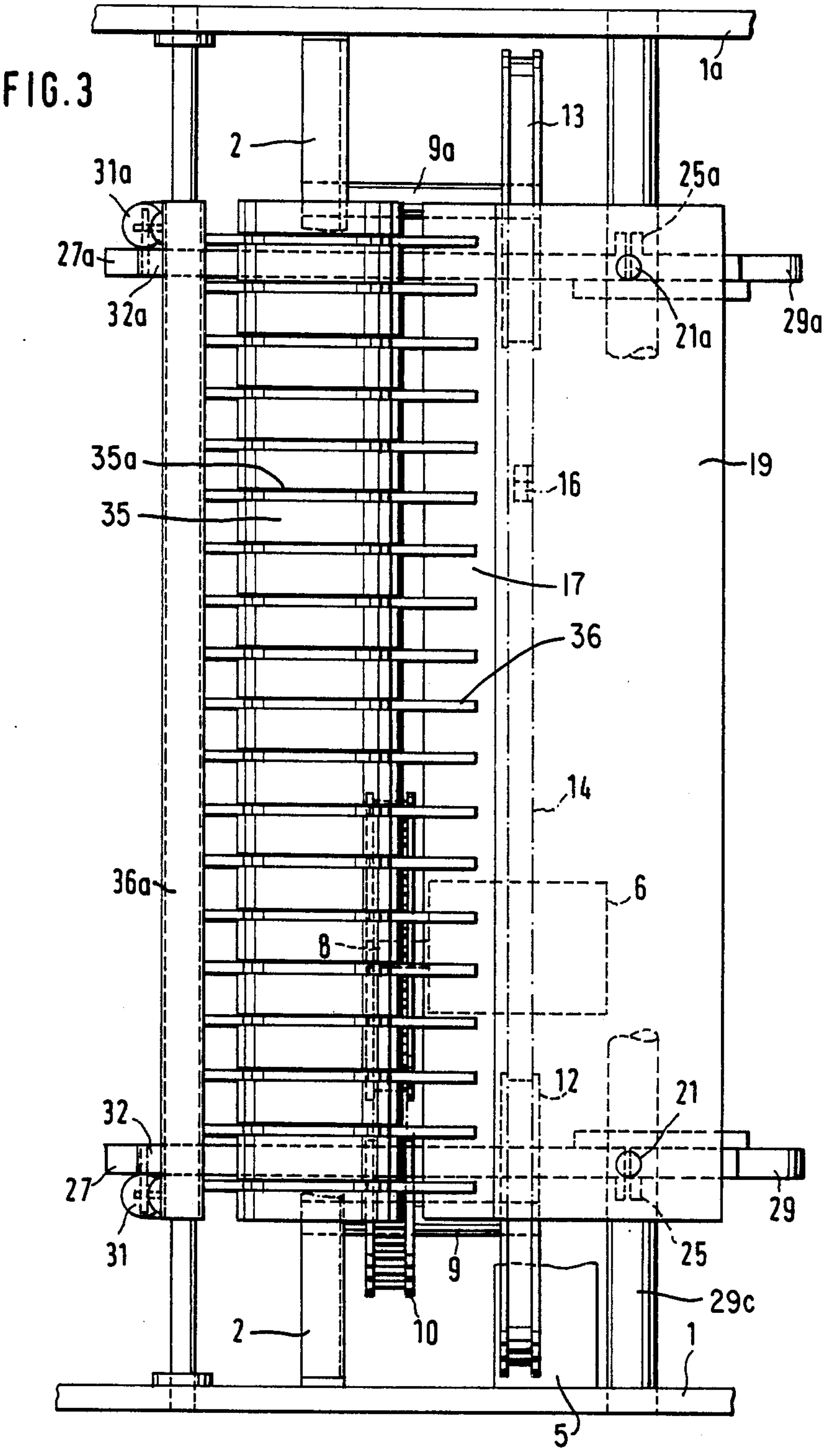
FIG. 3 is a fragmentary top plan view of the apparatus of FIG. 1.

Referring now to the drawings, and particularly to FIGS. 1 and 3 thereof, there is shown a portion of a bag making machine, the portion shown operating to intermittently convey a two-ply web of thermoplastic material with the plies in superposed relationship, and for effecting a transverse weld whereby the superposed plies are welded together along a line that extends in a direction transverse to the web movement direction, and for cutting the web transversely while it is in a stopped condition, the cutting operation performed along a line that is substantially parallel with the weld line. The apparatus includes two opposed side frames 1, 1*a* that are spaced from each other in a direction perpendicular to the direction of movement of a two-ply web of thermoplastic material W. FIG. 1 shows the apparatus in transverse elevation with side frame 1 removed. Each of side frames 1 and 1*a* is further supported by a suitable machine frame (not shown) and the web W of thermoplastic material moves in a plane perpendicular to the plane of FIG. 1 and in a direction from the left side thereof to the right side thereof, as will hereinafter be explained.

Extending between and interconnecting each of side frames 1 and 1*a* are a plurality of crossbeams 2, 3, 4, and 5, as well as a push rod guide member 26. As shown in FIG. 1, crossbeams 2, 3, and 5 can be channel beam sections while crossbeam 4 can be a solid member that extends between the respective side frames. Further, push rod guide member 26 includes a pair of transversely spaced parallel bores 26*a* that extend in a vertical direction as viewed in FIG. 1.

Crossbeam 5 supports a cutter drive motor 6, which is secured to crossbeam 5 by means of bolts, or the like. Drive motor 6 includes a drive shaft 8 that extends in a direction such that the axis of drive shaft 8 is substantially parallel to the direction of movement of the web. Drive shaft 8 is rotatably supported in crossbeam 3, and carries a drive pulley 7 that is keyed or otherwise secured to drive shaft 8 for rotation therewith. A pulley 10 is secured to and rotates with a cutter pulley drive shaft 9 that is parallel to drive shaft 8 and is rotatably carried in each of crossbeams 2 and 4. Drive shaft 9 extends rearwardly on the opposite side of crossbeam 4 from crossbeam 2 and carries a belt pulley 12 that is secured thereto for rotation therewith. A cogged drive belt 11 extends between drive pulley 7 and pulley 10 so that cutter drive motor 6 rotates drive shaft 9 through the belt and pulley arrangement hereinabove disclosed.

Figure 2:
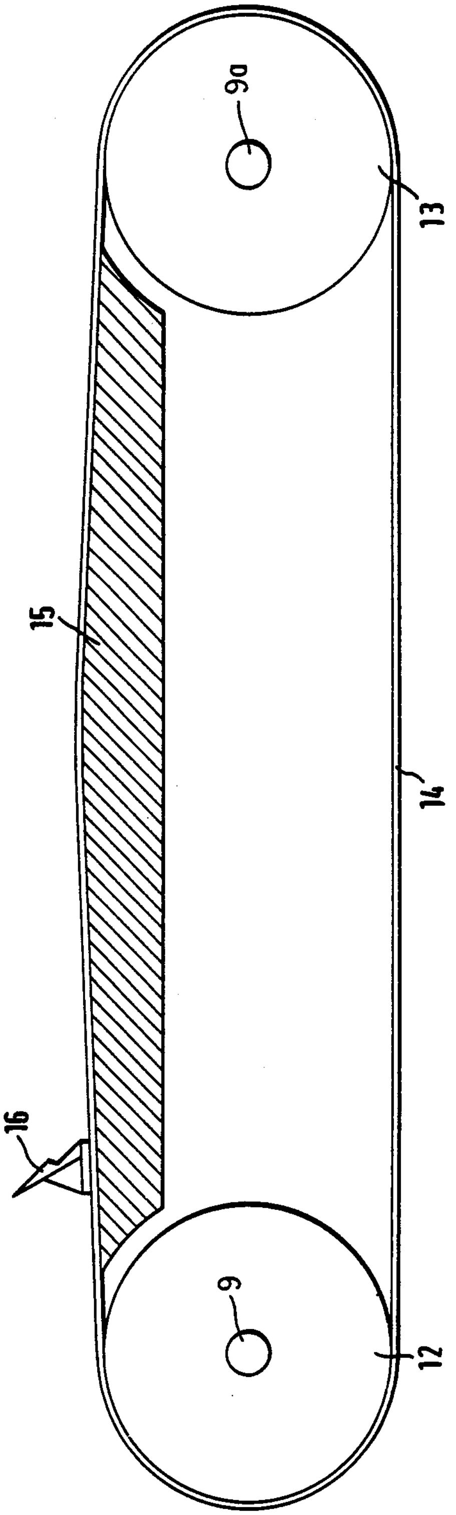
FIG. 2 is an enlarged, cross-sectional end elevation of a web severing knife and the supporting structure for supporting and guiding the knife for transverse movement relative to a web movement direction.

Referring now to FIGS. 2 and 3, cutter drive belt pulley 12, as well as cutter pulley drive shaft 9, are positioned adjacent to side frame 1, and a second drive shaft 9*a* is rotatably supported in crossbeams 2 and 4 on the opposite side of the device and adjacent to side frame 1*a*. A reversing pulley 13 is secured to shaft 9*a* for rotation therewith, and an endless carrying belt 14 extends between and passes around each of pulleys 12 and 13. Carrying belt 14 carries a severing knife 16 for transverse movement relative to the web movement direction, the severing knife having an elongated cutting edge. As best seen in FIG. 2, the upper run of the carrying belt between pulleys 12 and 13 is defined by a beam 15 that is secured to crossbeam 4 (see FIG. 1). Beam 15 can be convexly curved to cause severing knife 16 to describe a curved arc as it passes from cutter drive pulley 12 to reversing pulley 13. Alternatively, if desired, beam 15 can be defined by a pair of inclined surfaces that meet adjacent the center of the space between drive shafts 9 and 9*a*, the purpose of the curvature or inclined surfaces being to cause the severing knife to move toward and away from the plane of the web so that the same portion of the cutting edge of the knife will not continuously cut the web, and thereby cause high wear of the cutting edge at one point thereon. Further, as shown in FIG. 1, curved beam 15 can include a slot 15*a* to receive and guide belt 14 as it travels along the upper run between pulleys 12 and 13.

As best seen in FIG. 1, a stationary welding jaw 17 is secured to the uppermost surface of crossbeam 4 and extends transversely relative to the web movement direction. A movable welding jaw 19 is positioned above stationary welding jaw 17 and is supported for movement toward and away from the stationary jaw to effect welding of the web plies in a known manner, as will be appreciated by those skilled in the art. Movable welding jaw 19 is guided for movement toward and away from stationary jaw 17 and includes a body portion 19*a* that has a pair of transversely spaced bores 19*b* to permit a pair of transversely spaced push rods 21, 21*a* (see FIG. 3) to be slidably received therein. Each of push rods 21, 21*a*, is also slidably received in a pair of transversely spaced bores 26*a* that are provided in crossbeam 26, to define a push rod guide. Push rods 21 and 21*a* can be of any desired cross-sectional configuration.

As shown in the drawings, the apparatus can also include a stationary clamping jaw 18 which is secured to the downstream side of beam 15. Stationary jaw 18 is cooperable with a movable clamping jaw 20 that is also slidably supported for movement along push rods 21 and 21*a*. As can be seen in FIG. 1, welding jaws 17 and 19 are positioned to come into contact adjacent the upstream face of cutting knife 16, while clamping jaws 18 and 20 are adapted to come into contact adjacent the downstream face of cutting knife 16. The respective contacting surfaces of welding jaws 17 and 19 and of clamping jaws 18 and 20 when the respective jaws are in contact lie in a plane that is spaced below and is substantially parallel to the plane defined by the moving web W. Thus while the web is being clamped between the welding and clamping jaws it is deflected in a downward direction to a position in which severing knife 16 can pass through the respective plies of the web as the knife executes a transverse movement relative to the web movement direction.

As seen in FIG. 1, movable welding jaw 19 and movable clamping jaw 20 are each spring biased in a downward direction so that they are urged into contact with their respective cooperating stationary jaws. Each of push rods 21 and 21*a* includes a stop ring 21*c* secured to its uppermost end to serve as a stop for a compression spring 22 that extends between stop ring 21*c* and body portion 19*a* of movable welding jaw 19. A second compression spring 23 is positioned between body portion 19*a* of movable welding jaw 19 and the body portion of movable clamping jaw 20. Push rods 21 and 21*a* each include a clamping ring 24 positioned below movable clamping jaw 20 to move the respective movable jaws away from their cooperating stationary jaws upon upward movement of the push rods, as will hereinafter be explained. The lowermost ends of push rods 21 and 21*a* include respective links 25, 25*a* that are connected thereto by means of pinned connection. The lowermost, or opposite ends of each of links 25, 25*a*, are pinned to respective rocker levers 27, 27*a*, that extend in the web movement direction and are rotatably carried on a pivot shaft 28 that extends between side frames 1 and 1*a*. The ends of rocker levers 27, 27*a* to which respective links 25, 25*a*, are connected define cam followers, the lower surfaces of which are adapted to contact respective cam wheels 29, 29*a* that are secured to cam shaft 29*c* for rotation therewith. Cam shaft 29*c* is rotatably carried in each of side frames 1 and 1*a*, and can be rotated by any suitable rotation means (not shown). The cam follower portion of rocker levers 27, 27*a* are spring biased in a downward direction so that the cam follower surfaces ride against the outer surfaces of cam wheels 29, 29*a*, respectively. Tension springs 30 provide the biasing force and having one end secured to rocker levers 27, 27*a*, downstream of pivot 28 and the opposite ends secured to support arms 30, 30*a* fixed to the respective side frames. Thus the rotation of cam wheels 29, 29*a* cause vertical movement of push rods 21, 21*a* and of clamping rings 24 in an upward direction to move the movable jaws 19 and 20 away from the stationary jaws 17 and 18, respectively, and above the plane of web W, or, alternatively, to move clamping ring 24 in a downward direction so that respective compression springs 22 and 23 cause the movable jaws to come into contact with their associated stationary jaws.

Referring once again to FIGS. 1 and 3, extending between and rotatably carried by respective side frames 1 and 1*a* are a pair of parallel shafts 33, 35*c*, that carry respective feed rolls 34 and 35. The feed rolls define a nip area therebetween through which the two-ply web W of thermoplastic material passes in a plane that is substantially parallel to and spaced upwardly from the plane defined by the contacting surfaces of the respective welding and clamping jaws. The feed rollers 34 and 35 are suitably driven by appropriate driving means (not shown) of a type that is well known to those skilled in the art. Each of feed rollers 34 and 35 includes a plurality of circular grooves that are spaced along the axes of the respective rollers to define tube-receiving grooves. Extending within the respective grooves 35*a* and 34*a* are a plurality of air directing tubes 36, 37, respectively. The air directing tubes extend in the web movement direction are each connected to a source of pressurized air to cause air jets to issue from the tubes in the web movement direction, the air jets serving to support and guide the web as it passes from the nip of the feed rollers 34 and 35 toward the welding jaws 17, 19. Air directing tubes 36 are connected with upper air blowing rake tube 36*a* that is a tubular air distributor in communication with a source of pressurized air (not shown). Similarly, air directing tubes 37 are connected with a lower air blowing rake tube 37*a*, which, as is upper air blowing rake 36*a*, is a tubular air distributor in communication with a source of pressurized air (not shown). Upper air blowing rake tube 36*a* is stationary and is supported between respective side frames 1 and 1*a*. Lower air blowing rake tube 37*a*, on the other hand, is carried on a pair of levers 32, 32*a*, that are pivotally carried on shaft 33 so that lower rake tube 37*a*, and associated air directing tubes 37 can be pivoted through a predetermined arc relative to the axis of shaft 33 and relative to the web movement direction. The pivotal movement of tubes 37 is effected by rocker levers 27, 27*a* which at their ends upstream of pivot 28 and opposite from the ends that carry the cam follower surfaces includes an end of adjustable links 31, 31*a*, the other ends being pinned to levers 32, 32*a*, respectively. Adjustable link 31 can be a turnbuckle, or the like, as will be appreciated by those skilled in the art.

In operation, a two-ply web W of thermoplastic material is caused to move along a web movement direction by a suitable feed apparatus (not shown) and to enter the nip defined between feed rollers 34 and 35. Air directing tubes 37 extend substantially parallel to air directing tubes 36, as shown in dashed lines in FIG. 1 of the drawings. When the respective elements of the apparatus are in that position, the movable welding jaw 19 and movable clamping jaw 20 are spaced upwardly from their respective stationary jaws 17 and 18 a distance sufficient to permit the web to move along the plane defined by the web movement direction between the jaws, and to be guided by the air jets that issue from air directing tubes 36 and 37. When a predetermined length of the web has traveled beyond the vertical plane in which severing knife 16 lies, movement of the web is stopped, and by virtue of the rotation of cam wheel 29, push rods 21 and 21*a* move downwardly as the cam follower engages the reduced radius portion of cam wheel 29 relative to the axis of cam shaft 29*c*. Thus, clamping ring 24 moves downwardly, and, as a result, each of movable welding jaw 19 and movable clamping jaw 20 move downwardly by virtue by the forces exerted by respective springs 22 and 23, to engage the uppermost surface of the web and to deflect the web downwardly against stationary welding jaw 19 and stationary clamping jaw 18, respectively. As push rods 21 and 21*a* move downwardly, the opposite end of rocker lever 27 moves upwardly, and causes levers 32, 32*a* to pivot in a clockwise direction about shaft 33 by virtue of the interconnection between levers 32, 32*a*, and rocker levers 27, 27*a*, respectively through adjustable links 31, 31*a*. When levers 32, 32*a* pivot in a clockwise direction, as viewed in FIG. 1, air directing tubes 37 are also pivoted and the downstream ends thereof move downwardly away from web W and extend in the general direction shown by the solid lines in FIG. 1. Thus, the downstream ends of air directing tubes 37 are spaced below the plane of movement of the web, and as the web is moved downwardly by the respective movable jaws, the downstream ends of the air directing tubes are moved away from the deflected path of the web, in order to prevent damage to the web that would occur if the lower surface of the web contacted the downstream ends of air directing tubes 37.

When web W is in its clamped position between the respective stationary and movable jaws, the cutting knife 16, which is continuously driven and in timed relation to the operation of the jaws, severing knife 16 will initially be disposed outside the upper course of the carrying belt 14 as the web is deflected downwardly, so that during the descent of the web the severing knife cannot contact the web until the latter has been securely gripped between the respective jaws. The severing knife 16 then traverses along the upper surface of beam 15 to effect transverse cutting of the web. Because of the convex surface of beam 15 over which carrying belt 14 travels, cutting knife 16 will also move in a direction perpendicular to the plane of the clamped web so that the same limited portion of the cutting edge of the knife will not always cut the web and so that cutting action takes place along a given length of the cutting edges, to thereby avoid rapid wear of the cutting knife.

After the cutting operation has been completed, the cut portion of the web is transferred to a downstream station (not shown) for further handling. Additionally, after the severing operation has been completed, the rotation of cam wheel 29 progresses to the point where an enlarged radial portion of the cam moves the cam follower surface of rocker lever 27 so that the latter moves in a counterclockwise direction, as viewed in FIG. 1, to cause clamping ring 24 to bear against and to move movable clamping jaw 20 in an upward direction, away from stationary clamping jaw 18, as a result of which compression spring 23 exerts a similar upward force against movable welding jaw 19 to cause it to move upwardly and away from stationary welding jaw 17. The lowermost surfaces of each of jaws 19 and 20 are thus spaced above the corresponding stationary jaws a sufficient distance to permit the next section of the web to pass through the vertical plane in which the severing knife moves, in order to present an additional web section for welding and severing from the web. While the movable jaws are moving away from their respective stationary jaws, the counterclockwise rotation of rocker lever 27 carries adjustable links 31, 31*a* in a downward direction, to cause levers 32, 32*a* to pivot counterclockwise about shaft 33, and thereby cause air directing tubes 37 to assume a position substantially parallel to air directing tubes 36 for guiding the next section of web for movement toward the cutting station.

In the foregoing description, clamping jaws 18 and 20 have been described as performing merely a clamping function. However, if desired, those jaws can also define a second set of welding jaws to also provide a weld in the web section on the downstream side of the cutting knife, as well as a weld in the web on the upstream side of the cutting knife.

Although particular embodiments of the invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. Apparatus for making bags from a two-ply web of thermoplastic material by transversely cutting the web at longitudinally spaced intervals, said apparatus comprising:

a frame;

feed means supported by said frame for intermittently moving web in a web movement direction and in a web movement plane;

welding means supported by said frame for welding together the two plies of thermoplastic material when the web is stopped, the welding being accomplished along a weld line extending transversely to the direction of web movement;

cutting means supported by said frame for severing a bag from the web along a cutting line spaced downstream from and substantially parallel to said weld line, said cutting means including a severing knife positioned below the web movement plane and supported and guided for movement in a transverse direction relative to the web movement direction;

said welding means being operable to deflect the stopped web downwardly toward the severing knife a distance sufficient to weld the plies of the web and to enable the severing knife to sever the web in a transverse direction relative to the web movement direction, clamping means positioned on an opposite side of said severing knife from said welding means for clampingly engaging the web while welding thereof only takes place by said welding means, carrying means for carrying said severing knife, and convex beam means positioned below an upper run of said carrying means for carrying said severing knife in upward and downward directions relative to the web movement plane to cause cutting of the web to take place along a predetermined length of the severing knife.

2. Apparatus according to claim 1, wherein said feed means includes a pair of feed rollers to define a nip therebetween to convey the web in the web movement direction, said feed rollers positioned upstream of the welding means and including peripheral grooves at spaced axial positions therealong, said feed means including a plurality of upper and lower air directing tubes extending in the web movement direction and positioned above and below the web within the grooves of the feed rollers for supporting and guiding the web from the feed rollers to the welding means, and pivoting means operable as a movable welding jaw is lowered against the web, said pivoting means imparting pivotal movement of the air directing tubes below the web about a transverse axis relative to the web movement direction to pivot downstream ends of said air directing tubes in a direction away from the web movement direction, and wherein the severing knife moves continuously across the web direction in one direction of movement and across the web direction in a second direction of movement opposed to the first direction of movement, the second direction of movement being spaced below the first direction of movement.

3. Apparatus according to claim 1, including second welding means positioned on an opposite side of said severing knife from said first-mentioned welding means to simultaneously weld the web at both upstream and downstream positions relative to said severing knife.

4. Apparatus according to claim 1, including movement means for alternately lifting and lowering upper welding jaw means and upper clamping jaw means, said movement means including a rotatable cam means, rocker lever means pivotally carried in said machine frame and having one end engageable with a periphery of said cam means, said rocker lever connected to a push rod means drivingly connected with said movable jaw means, and link means at an opposite end of said rocker lever means for moving said lower air directing tubes pivotally away from said web movement plane while said upper welding and clamping jaw means are lowered.

5. Apparatus according to claim 2, including carrying means for carrying said severing knife, and convex beam means positioned below an upper run of said carrying means for carrying said severing knife in upward and downward directions relative to the web movement plane to cause cutting of the web to take place along a predetermined length of the severing knife.

6. Apparatus according to claim 1, wherein said convex beam means includes a convex surface defined by an upwardly convexly bowed supporting surface.

7. Apparatus according to claim 1, wherein said convex guide surface is defined by beam means including opposite upwardly sloping surfaces over which a severing knife carrying means passes.

8. Apparatus for making bags from a two-ply web of thermoplastic material by transversely cutting the web at longitudinally spaced intervals, said apparatus comprising:

a frame;

feed means supported by said frame for intermittently moving a web in a web movement direction and in a web movement plane;

welding means supported by said frame for welding together the two plies of thermoplastic material when the web is stopped, the welding being accomplished along a weld line extending transversely to the direction of web movement;

cutting means supported by said frame for severing a bag from the web along a cutting line spaced downstream from and substantially parallel to said weld line, said cutting means including a severing knife positioned below the web movement plane and supported and guided for movement in a transverse direction relative to the web movement plane;

said welding means being operable to deflect the stopped web downwardly toward the severing knife a distance sufficient to weld the plies of the web and to enable the severing knife to sever the web in a transverse direction relative to the web movement direction;

carrying means for carrying said severing knife; and convex beam means positioned below an upper run of said carrying means for carrying said severing knife in upward and downward directions relative to the web movement plane to cause movement of said severing knife toward and away from the plane of the web to thereby avoid having the same cutting portion of said severing knife from continuously cutting the web.

9. Apparatus according to claim 8, wherein said feed means includes a pair of feed rollers to define a nip therebetween to convey the web in the web movement direction, said feed rollers positioned upstream of the welding means and including peripheral grooves at spaced axial positions therealong, said feed means including a plurality of upper and lower air directing tubes extending in the web movement direction and positioned above and below the web within the grooves of the feed rollers for supporting and guiding the web from the feed rollers to the welding means, and pivoting means operable as a movable welding jaw is lowered against the web, said pivoting means imparting pivotal movement of the air directing tubes below the web about a transverse axis relative to the web movement direction to pivot downstream ends of said air directing tubes in a direction away from the web movement direction, and wherein the severing knife moves continuously across the web direction in one direction of movement and across the web direction in a second direction of movement opposed to the first direction of movement, the second direction of movement being spaced below the first direction of movement.

10. Apparatus according to claim 8, including clamping means positioned on an opposite side of said severing knife from said welding means for clampingly engaging the web while welding thereof takes place.

11. Apparatus according to claim 8, including second welding means positioned on an opposite side of said severing knife from said first-mentioned welding means to simultaneously weld the web at both upstream and downstream positions relative to said severing knife.

12. Apparatus according to claim 10, including movement means for alternately lifting and lowering upper welding jaw means and upper clamping jaw means, said movement means including a rotatable cam means, rocker lever means pivotally carried in said machine frame and having one end engageable with a periphery of said cam means, said rocker lever connected to a push rod means drivingly connected with said movable jaw means, and link means at an opposite end of said rocker lever means for moving said lower air directing tubes pivotally away from said web movement plane while said upper welding and clamping jaw means are lowered.

13. Apparatus according to claim 9, including carrying means for carrying said severing knife, and convex beam means positioned below an upper run of said carrying means for carrying said severing knife in upward and downward directions relative to the web movement plane to cause cutting of the web to take place along a predetermined length of the severing knife.

14. Apparatus according to claim 8, wherein said convex beam means includes a convex surface defined by an upwardly convexly bowed supporting surface.

15. Apparatus according to claim 8, wherein said convex guide surface is defined by beam means including opposite upwardly sloping surfaces over which a severing knife carrying means passes.

* * * * *